July 25, 1950  D. A. YOUNG  2,516,740
MOVING COIL ELECTRICAL INSTRUMENT
Filed April 30, 1947  2 Sheets-Sheet 1
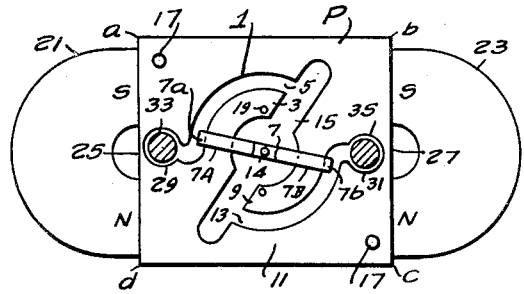
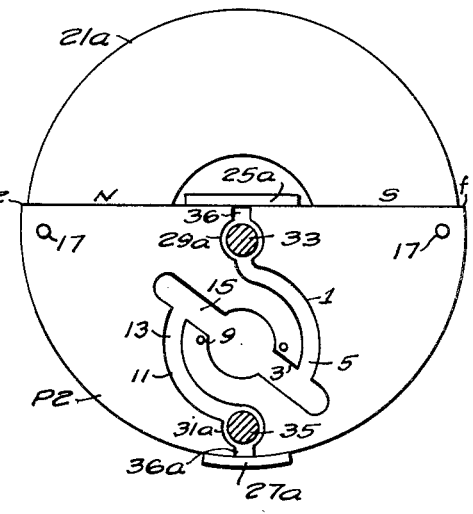
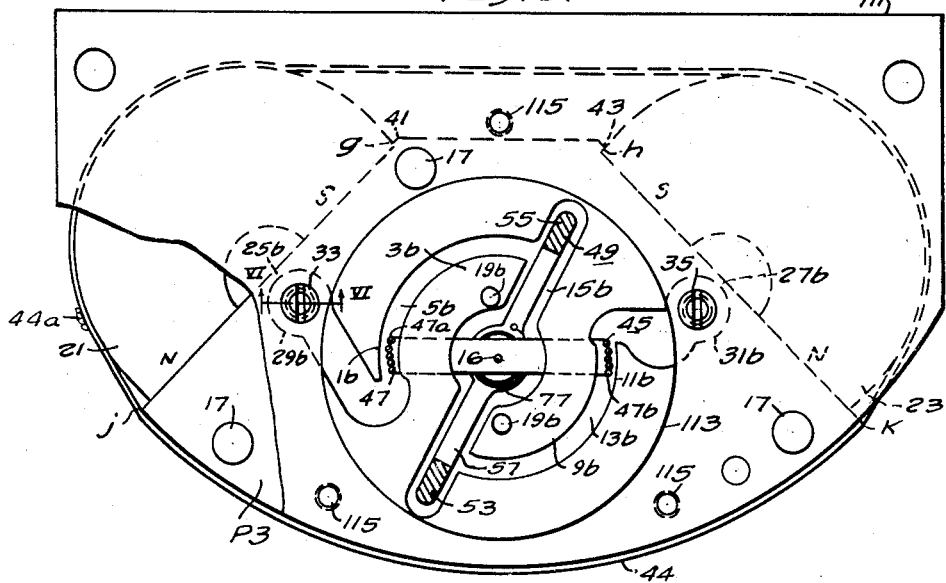
WITNESSES:
INVENTOR
Douglass A. Young.
BY C. L. Friedman
ATTORNEY

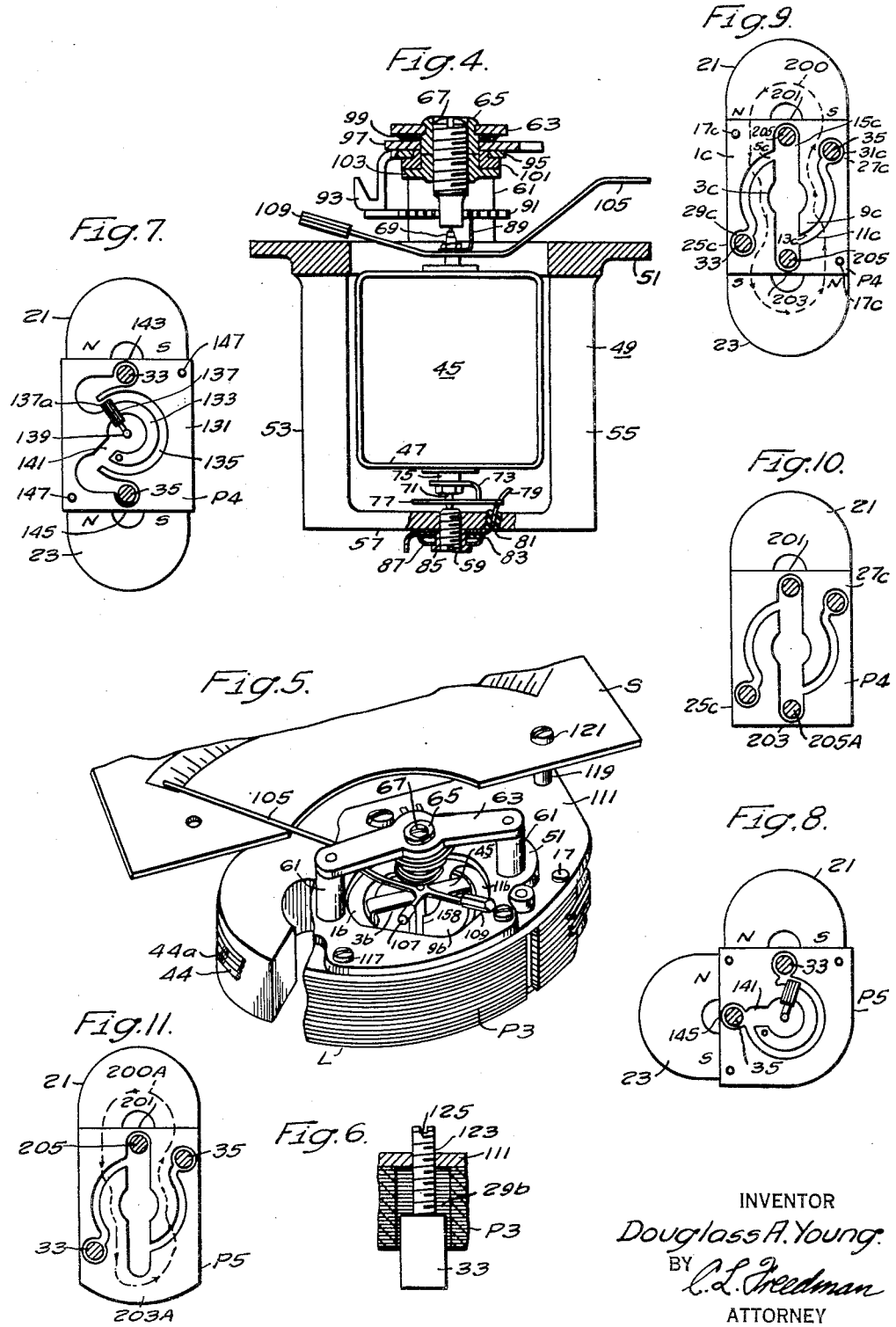

Patented July 25, 1950

2,516,740

UNITED STATES PATENT OFFICE 2,516,740

MOVING COIL ELECTRICAL INSTRUMENT

Douglass A. Young, East Orange, N. J., assignor to Westinghouse Electric Corporation, East Pittsburgh, Pa., a corporation of Pennsylvania Application April 30, 1947, Serial No. 745,025

20 Claims. (Cl. 171—95)

This invention relates to moving-coil devices, and it has particular relation to permanent-magnet, moving-coil electrical measuring instruments.

In the prior art, moving-coil devices have been employed for various purposes, such as measuring and relaying. For the purpose of illustration, the invention will be described with reference to permanent-magnet, moving-coil electrical measuring instruments.

Prior art permanent-magnet, moving-coil instruments have employed magnetic structures constructed of a plurality of magnetic parts which must be assembled during the manufacture of such instruments and which must be separated and reassembled during servicing operations. For optimum performance, permanent-magnet, moving-coil instruments should have small and highly accurate air gaps. For this reason, the prior art has employed elaborate machining techniques to permit accurate assembly of the various magnetic parts employed.

In the copending patent application of Young et al., Serial No. 570,029, filed December 27, 1944, and assigned to the assignee of the present application, (now Patent 2,508,439, issued May 23, 1950), a permanent-magnet, moving-coil instrument is disclosed wherein the magnetic parts may be constructed by an accurate punching operation. Furthermore, once the magnetic assembly for the instrument is assembled, it need not be disturbed during servicing operations.

A further desideratum for permanent-magnet, moving-coil instruments is the provision of an adjustment for the air gap magnetic field having a suitable range of adjustment. Such an adjustment greatly facilitates the calibration of instruments during manufacture and the recalibration of instruments in the field.

A further desideratum for permanent-magnet, moving-coil instruments is the provision of a design which permits the delicate moving element and control spring subassembly to be completely assembled and adjusted outside of the permanent-magnet subassembly.

In accordance with the invention, a moving coil device is provided wherein a magnetic structure may be constructed comprising a unitary magnetic pole-piece assembly. The magnetic structure is so designed that a moving coil associated therewith may be inserted in operative position and removed from operative position without disturbing the magnetic structure in any way. The invention also contemplates the provision of one or more adjustable magnetic shunts which permit adjustment of the air gap fields over a suitable range.

It is, therefore, an object of the invention to provide an improved moving-coil device having a unitary magnetic pole-piece assembly.

It is a further object of the invention to provide a permanent-magnet, moving-coil device having a unitary magnetic pole-piece assembly and having a moving coil which may be assembled in operative position or removed from operative position without disturbing the magnetic structure.

It is a still further object of the invention to provide a moving-coil device having a magnetic structure provided with an improved magnetic shunt permitting adjustment of the device over a suitable range.

Other objects of the invention will be apparent from the following description taken in conjunction with the accompanying drawings, in which:

Figure 1 is a view in plan with parts broken away of a moving-coil device embodying the invention;

Fig. 1a is a view in plan with parts broken away showing a modified moving-coil device embodying the invention.

Fig. 2 is a view in plan with parts broken away of a modified moving-coil device embodying the invention.

Fig. 3 is a view in plan with parts broken away of a further modified moving-coil device embodying the invention;

Fig. 4 is a view in side elevation with parts in section showing a moving-coil assembly suitable for the devices of Figs. 1, 2 and 3;

Fig. 5 is a view in perspective with parts broken away of the device illustrated in Fig. 3;

Fig. 6 is a detail view in section along the line VI—VI of Fig. 3, illustrating an adjustment suitable for the devices of Figs. 1, 2, 3 and 5; and Figs. 7, 8, 9, 10 and 11 are views in plan showing still further modifications of a moving-coil device embodying the invention.

Referring to Fig. 1, a moving-coil device is shown which includes an outer magnetic pole piece 1 and an inner magnetic pole piece 3 which are spaced to define an arcuate air gap 5. This air gap is proportioned for reception of a coil side 7a of a moving coil assembly 7. The device also includes an inner magnetic pole piece 9 and an outer magnetic pole piece 11 which are spaced to define a second arcuate air gap 13 which is proportioned for reception of a coil side 7b of the coil assembly 7.

The coil assembly 7 is mounted for rotation relative to the associated pole pieces about an axis 14. Although the air gaps may vary in configuration, it will be assumed that they are defined by cylindrical surfaces of the pole pieces and that they are concentric about the axis 14.

The general arrangement of the pole pieces is discussed at some length in the above-mentioned patent application. As therein pointed out, the coil assembly 7 may comprise a single coil having coil side 7a and 7b, and such a construction will be described below. For present purposes, it will be assumed, however, that the coil assembly 7 comprises two coils 7A and 7B, each having a coil side disposed in the associated air gap. Such a construction of the coil assembly also is discussed in the aforesaid patent application. Although the coil assembly may be mounted for rotation between bearing bridges secured to the associated magnetic structure in a conventional manner, advantages result from combining the coil assembly with a bearing support system in a complete subassembly which is secured to and removed from the associated magnetic structure as a complete unit. Such a construction will be described below.

It will be noted that the inner pole pieces 3 and 9 are spaced to define a passage 15 which communicates with the air gaps 5 and 13. By rotating the coil assembly 7 in a clockwise direction as viewed in Fig. 1 into alignment with the passage 15, the coil assembly may be removed in a direction parallel to the axis 14 through the passage 15 without disturbing the associated magnetic pole pieces in any way.

The various pole pieces may be of laminated construction. The laminations conveniently are similar in configuration and may be secured to each other by suitable rivets 17 and 19 to constitute a pole piece assembly P having the above-mentioned pole pieces.

Suitable sources of magnetomotive force are provided for the purpose of establishing magnetic fields in the air gaps 5 and 13. In the specific embodiment of Fig. 1, the sources of magnetomotive force take the form of permanent magnets 21 and 23. Since permanent-magnet material can be obtained in sheet form with good coercive properties, the entire magnetic structure including the permanent magnets may be formed of unitary laminations of such permanent-magnet sheet material. However, it is more practicable to provide separate permanent magnets which have pole faces abutting the pole-piece assembly. The pole-piece assembly then is constructed of soft magnetic iron or steel. Suitable polarities for the permanent magnets represented by north poles N and south poles S are illustrated in Fig. 1.

The pole-piece assembly may have any desired peripheral configuration. However, in Fig. 1 the pole-piece assembly is rectangular in shape and provides four sides or faces ab, bc, cd and da. It will be noted that the permanent magnet 21 has its pole faces abutting the face ad of the pole piece assembly whereas the permanent magnet 23 has its pole faces engaging the face bc of the pole piece assembly.

In order to maintain accurately the spacing of the pole pieces defining the air gap 5, the air gap is provided with a bridge 25 which accurately spaces the pole pieces 1 and 3. The same bridge 25 may be relied on for spacing the pole pieces 9 and 11. However, it is somewhat more desirable to provide a second bridge 27 for assisting in spacing the pole pieces. The bridge 27 extends across the air gap 13.

By the provision of these bridges, all of the pole pieces together with the bridges may be stamped or punched from unitary laminations of soft magnetic material. This means that the air gaps may be accurately defined during the punching operation and that the spacings of the pole pieces are permanently maintained by the bridges.

It will be noted that the bridges 25 and 27 shunt associated air gaps. In order to permit the establishment of adequate magnetic fields in the air gaps, the bridges 25 and 27 are proportioned to saturate well in advance of saturation of the associated pole pieces. Consequently, the permanent magnets 21 and 23 supply sufficient magnetic flux to saturate the bridges and to establish the desired magnetic fields in the air gaps 5 and 13. It has been found that the bridges 25 and 27 may have a cross section sufficient to require less than about 10% of the total magnetic flux from the permanent magnets to saturate the bridges and still provide adequate mechanical support for the various pole pieces.

In order to facilitate adjustment or calibration of the devices, the pole-piece assembly is provided with one or two cylindrical openings 29 and 31 which extend in directions parallel to the axis 14. These openings may be employed for defining the bridges 25 and 27. One or more magnetic shunts 33 and 35 may be introduced into the openings 25 and 31 for the purpose of shunting magnetic flux away from the associated air gaps. By adjusting the extent to which the magnetic shunts are introduced into the associated openings, the intensity of the magnetic fields in the air gaps 5 and 13 may be adjusted. Since it has been found that two shunts provide a range of adjustment substantially larger than that usually required, one magnetic shunt probably suffices for the majority of moving-coil devices. It will be understood that the range of adjustment is determined in part by the size of the openings 29 and 31, by the ratio of the diameter of each shunt to the diameter of its openings and the extent to which the shunt projects into its associated opening. Preferably, each magnetic shunt is constructed of a soft magnetic material such as soft iron or steel.

The pole pieces 3 and 9 form in effect an annular core which is divided into two parts by the diametric passage 15. The passage 15 may project beyond the air gaps 5 and 13 for the purpose of providing adequate clearance for a coil support. Such a support will be described below.

Since the bridges 25 and 27 are designed to saturate, they may be located within the recesses of the U-shaped magnets 21 and 23 in order to conserve space. In Fig. 1a, a pole-piece assembly P' may be similar to the assembly P of Fig. 1 except that the pole-piece assembly P' of Fig. 1a is configured to provide an arcuate bridge 25' which corresponds to the bridge 25 of Fig. 1 and which extends into the recess of the U-shaped permanent magnet 21. Each of the saturating bridges herein disclosed which shunts magnetic flux between the poles of a permanent magnet may be similarly constructed and located.

In the embodiment of Fig. 1, the air gaps 5 and 13 are in effect connected in parallel across the poles of each of the permanent magnets 21 and 23. For this reason, one of the permanent magnets may be omitted and a modification employing only one permanent magnet 21a is illustrated in Fig. 2.

Referring to Fig. 2, a pole-piece assembly P2 is provided which corresponds to the pole-piece assembly P of Fig. 1. The assembly P2 has openings 29a and 31a which corresponds to the openings 29 and 31 of Fig. 1. It will be noted that the permanent magnet 21a of Fig. 2 has pole faces N and S abutting a face of the pole piece assembly P2 which corresponds to the face da of Fig. 1. Furthermore, it will be noted that the pole-piece assembly P2 is of semicircular outline instead of the rectangular outline employed for the pole-piece assembly P of Fig. 1.

In Fig. 1 and in other figures, magnetic bridges are shown which shunt magnetic flux away from associated air gaps, but which permit utilization of unitary magnetic laminations. If it is desired to eliminate the shunting of magnetic flux from the air gaps by such bridges, the bridges may be constructed of a non-magnetic material such as brass. For example, in Fig. 2, a brass strip or bridge 25a is brazed or otherwise secured to the laminations intermediate the surfaces which receive the sole faces of the permanent magnet 21a. A channel 36 then is machined from the opening 29a to the bridge 25a. In a similar manner, a brass bridge 27a and a channel 36a may be provided for the opening 31a. Except for these changes, the device of Fig. 2 is similar to that of Fig. 1 and further discussion thereof appears unnecessary.

In Figs. 3, 4 and 5, a permanent magnet, moving coil electrical measuring instrument is illustrated which is based largely on the structure shown in Fig. 1. This instrument includes a pole-piece assembly P3 which corresponds to the pole-piece assembly P of Fig. 1 with its desirable unitary lamination construction. The pole pieces 1, 3, 9 and 11, the air gaps 5 and 13, the bridges 25 and 27 and the openings 29 and 31 and the passage 15 of Fig. 1 are employed substantially unchanged in the instrument of Figs. 3 to 5 and each of the corresponding components in Figs. 3 and 5 is identified by the same reference character followed by the identifying letter "b."

As shown more clearly in Fig. 5, the pole-piece assembly P3 is constructed of a plurality of soft magnetic unitary laminations L which are secured to each other by means of the rivets 17. The principal differences between the shape of the laminations in the pole-piece assembly P3 from the shape of the laminations of the pole-piece assembly P of Fig. 1 may briefly be set forth. By comparison of Figs. 1 and 3, it will be noted that the side ab of the pole-piece assembly P has been shortened to provide the side gh of Fig. 3. In addition, the side dc of the pole-piece assembly P has been lengthened and made arcuate to provide the side jk of the pole-piece assembly P3. In addition, small lips 41 and 43 are provided in the pole-piece assembly P3 to assist in maintaining the permanent magnets 21 and 23 in their correct positions. The permanent magnets and the pole-piece assembly P3 may be secured in assembled relationship by means of suitable bands 44. Conveniently, these bands may be constructed of brass wire which is wound under tension around the permanent magnets and the pole-piece assembly and which is secured, while under tension, by means of solder 44a.

As previously pointed out, the moving-coil assembly may comprise a single coil or a pair of separate coils, each having a coil side disposed in one of the airgaps. In the modification illustrated in Figs. 3, 4 and 5, a coil assembly 45 is employed which includes a single coil 47 mounted for rotation about the axis 16 with respect to the pole piece assembly. This coil 47 has coil sides 47a and 47b disposed respectively in the air gaps 5b and 13b.

The passage 15b projects beyond the air gaps 5b and 13b to provide space for a coil support 49. This coil support together with the remaining components of the coil assembly are shown more clearly in Fig. 4. The coil support includes a generally annular flange 51 having two struts 53 and 55 projecting therefrom. These struts are connected at their lower ends as viewed in Fig. 4, by a bridging member 57. The bridging member has a threaded opening positioned for reception of a bearing screw 59. The flange 51 also has posts 61 projecting therefrom to which a bridging strip 63 is secured. The bridging strip 63 has a threaded bushing 65 secured thereto for reception of a bearing screw 67. The bearing screws may have glass or other suitable jewel cups for receiving rotatably pivots associated with the coil 47 in a manner well understood in the art. Conveniently, the flange 51 and struts 53 and 55, the bridging member 57 and the bridging strip 63 may be cast integrally from a suitable die-casting alloy, such as an aluminum base alloy.

The coil 47 has projecting from its opposite sides thereof a pair of stub shafts 69 and 71 which engage respectively the bearing screws 67 and 59 to mount the coil for rotation relative to the coil support 49, and which are suitably insulated from each other. The shaft 71 carries a lug 73 which is secured to the shaft by a bushing 75. The lug 73 is secured to the inner end of a spiral electro-conductive spring 77. The outer end of the spring 77 is soldered to an electro-conductive member or abutment 79 which passes through insulating tubes 81 and 83 secured to the bridging member 57. Conveniently, a lock nut 85 may be in threaded engagement with the bearing screw 59 and may secure to the bridging member 57 a spring cup washer 87 which, in turn, secures the insulating tube 83 to the bridging member.

The shaft 69 has secured thereto a lug 89 which is attached to the inner end of an electro-conductive spiral spring 91. The outer end of the spring 91 is soldered or otherwise secured to an electro-conductive abutment 93. This abutment may be adjusted about the axis of rotation of the coil 47 for the purpose of adjusting the zero position thereof in a manner well understood in the art. For example, the abutment 93 may be secured to a ring 95. This ring engages a second ring 97 and together with a spring cup washer 99 and a bushing 101 is retained between the bridging strip 63 and a lock nut 103 which is in threaded engagement with the bearing screw 67. The zero adjusting mechanism herein described may be substantially similar to that disclosed in the Thomander Patent 2,389,393.

The shaft 69 also has secured thereto a pointer 105 which, as shown in Fig. 5, is disposed for movement over a scale plate S. Adjustable weights 107 and 109 may be provided for the pointer to adjust the balance of the moving coil and pointer assembly in a manner well understood in the art.

To facilitate the mounting of the various components of the pole-piece assembly P3, a non-magnetic plate, such as a brass plate 111, may be secured to the pole-piece assembly P3 by the rivets 17. (See Figs. 3 and 5.) This plate has an opening 113 of sufficient size to permit passage therethrough of the moving coil assembly 45 for the purpose of bringing the flange 51 (Fig. 5) into engagement with the plate 111. The plate 111 is provided with threaded openings 115 (Fig. 3) for reception of machine screws 117 (Fig. 5) which are employed for securing the flange 51 to the plate 111. As shown in Fig. 5, spacers 119 may be secured to the plate 111 and the scale plate S may be secured to the spacers by suitable machine screws 121.

As previously pointed out, shunts 33 and 35 may be employed singly or together for the purpose of adjusting the strength of the magnetic fields in the air gaps 5 and 13 of 5b and 13b. A suitable construction for such shunts is illustrated in Fig. 6. In Fig. 6, it will be noted that the plate 111 has a threaded opening for reception of a machine screw 123 which projects from one end of the magnetic shunt 33. The machine screw may be accessible for adjustment from either the rear or front of a case which surrounds the instrument. For the purpose of illustration, it will be assumed that the machine screw has a screw driver slot 125. By inspection of Fig. 6, it will be observed that a screw driver may be inserted in the slot 125 for the purpose of advancing or retracting the shunt 33 with respect to the pole-piece assembly P3. In this way, the strength of the magnetic fields in the air gaps of the pole-piece assembly P3 may be adjusted as desired.

It is believed that the construction of the instrument illustrated in Figs. 3, 4 and 5 is apparent from the foregoing description. The laminations L are first accurately punched to the desired configuration. These laminations are then assembled on the plate 111 and secured to each other and to the plate 111 by means of the rivets 17. The permanent magnets 21 and 23 are then placed in engagement with appropriate faces of the pole-piece assembly P3 and the wire 45 is applied for the purpose of securing the various components of the magnetic structure permanently in place. The permanent magnets may be magnetized in any suitable manner. For example, the required magnetomotive force may be established between the pole pieces 1b and 11b for magnetizing the permanent magnets in the manner well understood in the art. Once the magnetic structure has been assembled and magnetized, it need not be disturbed further during the operation of the instrument. If desired, one or more of the shunts 33 and 35 may be associated with the magnetic structure.

The moving-coil assembly is next assembled as shown in Fig. 4. The complete moving-coil assembly then is introduced into the passage 15b of the magnetic structure until it occupies the position illustrated in Fig. 5. It will be understood that during such introduction of the moving-coil assembly into the passage 15b, the moving coil 47 is positioned in the same plane as the struts 53 and 55 and that all parts below the flange 51 in Fig. 4 are proportioned to permit passage thereof through the passage 15b of the magnetic structure. The machine screws 117 then are employed for securing the flange 51 to the plate 111. Thereafter, conductors may be soldered to the abutments 93 and 79 for the purpose of applying current to be measured to the moving coil 47. If the instrument requires servicing, the moving-coil assembly may be removed from its associated magnetic structure by a procedure which is the reverse of that which has just been described.

Although the invention is particularly desirable for instruments employing moving coils which are mounted for rotation with respect to an associated magnetic structure about an axis which is intermediate two sides of the coil, certain aspects of the invention also are desirable for instruments wherein only one coil side is positioned in an air gap. Instruments of this general type are disclosed in the aforesaid Thomander patent.

Referring to Fig. 7, a pole-piece assembly P4 is illustrated which includes an outer pole piece 131 and an inner pole piece 133. These pole pieces are spaced to provide an arcuate air gap 135. A moving-coil assembly 137 has a coil side 137a disposed in the air gap 135 for rotation about an axis 139. The inner magnetic pole piece 133 has substantially a hook shape. It will be noted that the tip of the hook is spaced from the shank of the hook to provide a passage 141. The moving-coil assembly 137 may be substantially similar to that illustrated in the aforesaid Thomander patent and may be proportioned for movement from a position external to the pole-piece assembly P4 through the passage 141 into operative relationship with respect to the pole-piece assembly.

The inner and outer pole pieces 131 and 133 are connected by means of one or more bridges such as the bridges 143 and 145. The inner and outer magnetic pole pieces and the bridges 143 and 145 conveniently are formed of a plurality of unitary laminations which are secured to each other by means of rivets 147. Although the bridges 143 and 145 shunt the air gaps 135, they are designed to saturate well in advance of saturation of the associated pole pieces. This permits the establishment of the desired magnetic field in the air gap 135.

It will be understood that the laminations may be constructed of a soft magnetic metal, such as soft iron or steel. Either or both of the permanent magnets 21 and 23 may be employed to establish the desired magnetic field in the air gap 135. It will be noted that each of the permanent magnets has a separate pole piece in engagement with each of the pole pieces 133 and 135. Suitable polarities for the permanent magnets are indicated by north poles N and south poles S in Fig. 7. One or both of the magnetic shunts 33 and 35 may be employed for the purpose of adjusting the strength of the magnetic field in the air gap 135. Since these shunts operate in the same manner discussed with reference to Fig. 6, it is believed that further discussion thereof is unnecessary.

In Fig. 8, a modification of the instrument shown in Fig. 7 is presented. This modification comprises the movement of the permanent magnet 23 from the position illustrated in Fig. 7 to that illustrated in Fig. 8. Such a movement of the permanent magnet also requires a movement of the bridge 145 and the associated shunt 35. The instrument of Fig. 8 employs a pole-piece assembly P5 which otherwise is substantially similar to that of Fig. 7. For this reason, a detailed description of the instrument of Fig. 8 is believed to be unnecessary. The construction shown in Fig. 8 may be more suitable for the circular case commonly employed for electrical measuring instruments. In some cases only one of the permanent magnets shown in Fig. 8 may be employed.

In the embodiments of Figs. 1, 2, 3 and 5, it will be recalled that the air gaps are in effect connected in parallel across the poles of one or more permanent magnets. The principles of the invention may be incorporated in a magnetic structure having two air gaps which in effect are connected together with one or more sources of magnetomotive force in a series magnetic circuit. Such embodiments are illustrated in Figs. 9, 10 and 11.

Referring to Fig. 9, a magnetic structure is disclosed which may be compared to some extent with the magnetic structure of Fig. 1. The magnetic pole pieces 1, 3, 9 and 11, the air gaps 5 and 13, the passage 15, the bridges 25 and 27, and the openings 29 and 31 are employed substantially unchanged in the embodiment of Fig. 9 and are identified by the same reference characters followed by the identifying letter "c." It will be understood that a moving coil may be associated with the magnetic pole-piece assembly P4 of Fig. 9 in the same manner discussed with reference to the magnetic structures of Figs. 1, 2, 3 and 5.

Examining the magnetic structures of Fig. 9 in greater detail, it will be noted that the permanent magnets 21 and 23 are employed for directing magnetic flux through the air gaps 5c and 13c. The air gaps, however are connected with the permanent magnets in what may be termed a series magnetic circuit. The path of magnetic flux in this circuit is indicated in Fig. 9 by a dotted line 200. Polarities for the permanent magnets are indicated by the reference characters N for north pole and S for south pole. By inspection of Fig. 9 it will be observed that the magnetic pole-piece assembly P4 may be divided into two halves which are connected by magnetic bridges 201 and 203. These bridges are somewhat similar to the magnetic bridges 25c and 27c and are designed to saturate well in advance of any saturation of the magnetic pole pieces. Consequently, the permanent magnets must not only supply sufficient magnetic flux for the air gaps 5c and 13c, but they must supply additional magnetic flux for the saturated bridges 25c, 27c, 201 and 203. It will be understood that the pole-piece assembly P4 may be constructed from unitary magnetic laminations united by the rivets 17 in a manner similar to that discussed for Figs. 1, 2, 3 and 5. Each of the laminations would have an outline similar to that shown in Fig. 9 for the complete pole-piece assembly.

The magnetic shunts 33 and 35 again may be employed for the purpose of shunting magnetic flux away from the air gaps 5c and 13c. However, the structure of the pole-piece assembly in Fig. 9 permits the utilization of magnetic shunts 205 for essentially the same purpose. These shunts 205 may be similar in structure and operation to the magnetic shunts 33 and 35. It will be noted that each of these shunts 205 shunts one of the magnetic bridges 201 and 203. By adjustment of the magnetic shunt 205 associated with the magnetic bridge 201, magnetic flux from the permanent magnet 21 may be passed directly between the pole piece of the permanent magnet, and consequently such magnetic flux does not pass through the air gaps of the pole-piece assembly. The amount of magnetic flux thus diverted away from the air gaps may be adjusted by adjustment of the magnetic shunt 205 in the same manner discussed with reference to the adjustment of the magnetic shunt 33. In order to provide adequate room for the shunts 205, it may be necessary to lengthen or elongate the passage 15c in a vertical direction, as viewed in Fig. 9, compared to the length of the passage 15 of Fig. 1.

In actual practice all of the shunts 33, 35 and 205 ordinarily would not be employed. In view of the series relationship of the air gaps 5c and 13c, each of the magnetic shunts 33 and 35 in Fig. 9 affects to a substantial extent only the magnetic flux passing through its associated air gap. Consequently, in order to maintain the magnetic flux in the two air gaps substantially equal, it may be desirable to employ both of the magnetic shunts 33 and 35 and to adjust the two shunts substantially to the same extent.

Each of the magnetic shunts 205 affects the magnetic flux passing through both of the air gaps to substantially the same extent. Consequently, in practice, one of the magnetic shunts 205 probably would suffice for the average magnetic pole-piece assembly.

Since each of the permanent magnets 21 and 23 is instrumental in supplying magnetic flux to both of the air gaps of Fig. 9, it is possible to eliminate one of the permanent magnets, such as the permanent magnet 23. The resulting structure is shown in Fig. 10. The magnetic bridge 203 of the magnetic pole piece assembly P4 in Fig. 10 has a magnetic adjustor 205A associated therewith which in structure may be similar to the magnetic shunts 205 of Fig. 9. However, by inspection of Fig. 10, it will be noted that the magnetic adjustor 205A no longer shunts magnetic flux away from the air gaps of the magnetic pole-piece assembly but instead changes the magnetic reluctance offered to magnetic flux supplied by the permanent magnet 21. Since the magnetic adjustor 205A would suffice for adjusting the magnetic fields in the air gaps of the magnetic pole-piece assembly P4 of Fig. 10, the magnetic shunts associated with the magnetic bridges 25c, 27c and 201 need not be employed. Since the embodiment of Fig. 10 does not differ in any other respect from the embodiment of Fig. 9, a further discussion thereof is believed to be unnecessary.

If desired, the magnetic bridge 203 of Fig. 10 may be enlarged to provide a non-saturating bridge, and the associated adjustor 205A then could be omitted. The resulting structure is illustrated in Fig. 11. It will be noted that a bridge 203A is provided in Fig. 11 which has a cross-section substantially larger than that of the bridge 203 of Fig. 10. This cross-section may be such that the bridge 203A does not saturate when carrying the magnetic flux represented in Fig. 11 by the dotted line 200A which establishes the desired magnetic fields in the air gaps of the magnetic pole-piece assembly P5 of Fig. 11. To provide adequate adjustment of the magnetic fields in the air gaps of the magnetic pole-piece assembly P5, the magnetic shunt 205 associated with the magnetic bridge 201 may be employed or the two magnetic shunts 33 and 35 may be employed or all three magnetic shunts may be employed as desired. Since the structure of Fig. 11 does not differ in any further material respect from the structure illustrated in Fig. 10, a further description of Fig. 11 is believed to be unnecessary.

Although the invention has been described with reference to certain specific embodiments thereof, numerous modifications thereof are possible. Therefore, the illustrations and descriptions herein presented are to be construed in an illustrative and not in a limiting sense.

I claim as my invention:

1. In a moving-coil device, a coil, and a unitary magnetic structure comprising a pair of magnetic pole pieces spaced to define an air gap within which only one side of the coil is disposed, a source of magnetomotive force for establishing between the pole pieces a substantially predetermined magnetomotive force, and a magnetic bridge bridging the air gap for spacing the pole pieces from each other, said magnetic bridge having a flux-carrying cross section sufficiently small to limit the magnetic flux traversing the magnetic bridge to a value substantially smaller than the value of the magnetic flux traversing said air gap when said source establishes said predetermined magnetomotive force between the pole pieces.

2. In a permanent-magnet, moving-coil device, a stator assembly comprising a unitary magnetic structure, a moving-coil assembly, and means mounting the moving-coil assembly for rotation relative to the magnetic structure about an axis intermediate two coil sides of the coil assembly, said unitary magnetic structure having a magnetic core unit of soft magnetic material disposed within the moving-coil assembly, and magnetic portions of soft magnetic material spaced from the magnetic core unit for defining an air gap for each of said coil sides, the stator assembly comprising a permanent-magnet assembly for directing magnetic flux through the magnetic structure to establish magnetic fields in the air gaps.

3. In a permanent-magnet, moving-coil device, a unitary magnetic structure, a moving-coil assembly, means mounting the moving-coil assembly for rotation relative to the magnetic structure about an axis intermediate two coil sides of the coil assembly, said unitary magnetic structure having a magnetic core unit of soft magnetic material disposed within the moving-coil assembly, and magnetic portions of soft magnetic material spaced from the magnetic core unit for defining an air gap for each of said coil sides, said magnetic core unit having a passage therethrough communicating with the air gaps through which the moving-coil assembly may be removed from operative position relative to the magnetic structure to a position displaced from the magnetic structure, and a permanent-magnet assembly associated with the magnetic structure for directing magnetic flux through the air gaps.

4. In a magnetic device for a moving-coil unit, a unitary magnetic structure comprising first and second inner magnetic pole pieces disposed on opposite sides of an axis to define a passage therebetween, first and second outer magnetic pole pieces spaced angularly about said axis and substantially surrounding the inner magnetic pole pieces, said first magnetic pole pieces being spaced radially with respect to said axis to define a first arcuate air gap, said second magnetic pole pieces being spaced radially with respect to said axis to define a second arcuate air gap, said air gaps having corresponding angular extremities in communication with the passage, whereby a coil unit may be inserted into the passage and rotated to introduce appropriate coil sides into the air gaps for rotation about the axis, magnetic means clear of said passage and said air gaps cooperating with the pole pieces for directing magnetic flux across the air gaps, and a magnetic member magnetically shunting one of the air gaps, said magnetic member being proportioned to saturate substantially in advance of saturation of said magnetic means when carrying a value of magnetic flux which is a small proportion of the value of magnetic flux traversing the air gaps, whereby said magnetic member mechanically unites the associated pole pieces while permitting establishment of adequate magnetic air gap fields.

5. In a magnetic device for a moving-coil unit, a unitary magnetic structure comprising first and second inner magnetic pole pieces disposed on opposite sides of an axis to define a passage therebetween, first and second outer magnetic pole pieces spaced angularly about said axis and substantially surrounding the inner magnetic pole pieces, said first magnetic pole pieces being spaced radially with respect to said axis to define a first arcuate air gap, said second magnetic pole pieces being spaced radially with respect to said axis to define a second arcuate air gap, said air gaps having corresponding angular extremities in communication with the passage, whereby a coil unit may be inserted into the passage and rotated to introduce appropriate coil sides into the air gap for rotation about the axis, magnetic means clear of said passage and said air gaps cooperating with the pole pieces for directing magnetic flux across the air gaps, and a magnetic member magnetically shunting one of the air gaps, said magnetic member being proportioned to saturate substantially in advance of saturation of said magnetic means, whereby said magnetic member mechanically unites the associated pole pieces while permitting establishment of adequate magnetic air gap fields, adjustable magnetic means cooperating with the magnetic member for adjustably magnetically shunting at least one of said air gaps, whereby the air gap magnetic field intensity may be adjusted by operation of the adjustable magnetic means, and a source of magnetomotive force for supplying magnetic flux to said magnetic structure.

6. In a magnetic device for a moving-coil unit, a unitary magnetic structure comprising first and second inner magnetic pole pieces disposed on opposite sides of an axis to define a passage therebetween, first and second outer magnetic pole pieces spaced angularly about said axis and substantially surrounding the inner magnetic pole pieces, said first magnetic pole pieces being spaced radially with respect to said axis to define a first arcuate air gap, said second magnetic pole pieces being spaced radially with respect to said axis to define a second arcuate air gap, said air gaps having corresponding angular extremities in communication with the passage, whereby a coil unit may be inserted into the passage and rotated to introduce appropriate coil sides into the air gap for rotation about the axis, magnetic means clear of said passage and said air gaps cooperating with the pole pieces for directing magnetic flux across the air gaps, and a magnetic member magnetically shunting one of the air gaps, said magnetic member being proportioned to saturate substantially in advance of saturation of said magnetic means, whereby said magnetic member mechanically unites the associated pole pieces while permitting establishment of adequate magnetic air gap fields, a magnetic screw positioned to establish a magnetic path shunting at least one of the air gaps, and threaded means engaging said screw for urging said screw in an axial direction relative to the magnetic structure in response to rotation of the screw to vary the magnetic path established by the screw.

7. In a magnetic device for a moving-coil assembly, a source of magnetomotive force, and a unitary magnetic structure comprising first and second inner magnetic pole pieces disposed on opposite sides of an axis to define a passage therebetween, first and second outer magnetic pole pieces spaced angularly about said axis and substantially surrounding the inner magnetic pole pieces, said first magnetic pole pieces being spaced radially with respect to said axes to define a first arcuate air gap, said second magnetic pole pieces being spaced radially with respect to said axis to define a second arcuate air gap, said air gaps having corresponding angular extremities in communication with the passage, means magnetically connecting the first inner magnetic pole piece and the second outer magnetic pole piece as a unit to a first pole of the source of magnetomotive force by a path clear of said passage and air gaps, means magnetically connecting the first outer magnetic pole piece and the second inner magnetic pole piece as a unit to a second pole of the source of magnetomotive force by a path clear of said passage and air gaps, and magnetic means connecting said units, said last-named means being proportioned to saturate at a small proportion of the normal operating magnetomotive force developed by said source, said passage being accessible from the exterior of said magnetic structure, whereby a coil assembly may be inserted into the passage and rotated to introduce appropriate coil sides into the air gap.

8. In a magnetic device for a moving-coil assembly, a source of magnetomotive force, and a unitary magnetic structure comprising first and second inner magnetic pole pieces disposed on opposite sides of an axis to define a passage therebetween, first and second outer magnetic pole pieces spaced angularly about said axis and substantially surrounding the inner magnetic pole pieces, said first magnetic pole pieces being spaced radially with respect to said axis to define a first arcuate air gap, said second magnetic pole pieces being spaced radially with respect to said axis to define a second arcuate air gap, said air gaps having corresponding angular extremities in communication with the passage, means magnetically connecting the first inner magnetic pole piece and the second outer magnetic pole piece as a unit to a first pole of the source of magnetomotive force by a path clear of said passage and air gaps, means magnetically connecting the first outer magnetic pole pieces and the second inner magnetic pole piece as a unit to a second pole of the source of magnetomotive force by a path clear of said passage and air gaps, and magnetic means connecting said units, said last-named means being proportioned to saturate at a small proportion of the magnetomotive force developed by said source; adjustable magnetic means for conducting magnetic flux between the poles of said source by a path displaced from at least one of the air gaps, said adjustable magnetic means being adjustable for varying the magnetic reluctance of said last-named path, a coil assembly having two coil sides disposed respectively in said air gaps, and means mounting the coil unit for rotation relative to the magnetic structure about an axis intermediate the coil sides, said coil assembly being proportioned for rotation from operative position into alignment with said passage and for removal through said passage to a position external to the magnetic structure.

9. In a moving-coil instrument; a unitary magnetic structure; a moving-coil unit having two spaced coil sides; means mounting the moving-coil unit for rotation relative to the magnetic structure about an axis intermediate the coil sides, said magnetic structure having a passage permitting removal of the coil unit through a predetermined path from operative position relative to the magnetic structure to a position external to the magnetic structure; said magnetic structure comprising first inner and outer magnetic pole pieces disposed on a first side of said passage, said pole pieces being spaced to define an arcuate air gap extending around said axis for reception of a first one of the coil sides, second inner and outer magnetic pole pieces disposed on a second side of said passage, said second pole pieces being spaced to define an arcuate air gap extending around said axis for reception of a second one of the coil sides, said inner magnetic pole pieces being positioned between the air gaps, and a magnetic member magnetically shunting one of the air gaps; and a source of magnetomotive force spaced from the magnetic member for directing magnetic flux through said air gaps, said magnetic member being proportioned to saturate in response to the normal working magnetomotive force developed across the associated air gap.

10. In a moving-coil instrument; a unitary magnetic structure; a moving-coil unit having two spaced coil sides; means mounting the moving-coil unit for rotation relative to the magnetic structure about an axis intermediate the coil sides, said magnetic structure having a passage permitting removal of the coil unit through a predetermined path from operative position relative to the magnetic structure to a position external to the magnetic structure; said magnetic structure comprising first inner and outer magnetic pole pieces disposed on a first side of said passage, said pole pieces being spaced to define an arcuate air gap extending around said axis for reception of a first one of the coil sides, second inner and outer magnetic pole pieces disposed on a second side of said passage, said second pole pieces being spaced to define an arcuate air gap extending around said axis for reception of a second one of the coil sides, said inner magnetic pole pieces being positioned between the air gaps, and a magnetic member magnetically shunting one of the air gaps; and a source of magnetomotive force for directing magnetic flux through said air gaps, said magnetic member being proportioned to saturate in response to the magnetomotive force developed across the associated air gap, and magnetic means adjustably shunting the magnetic member.

11. In a moving-coil instrument; a unitary magnetic structure; a moving-coil unit having two spaced coil sides; means mounting the moving-coil unit for rotation relative to the magnetic structure about an axis intermediate the coil sides, said magnetic structure having a passage permitting removal of the coil unit through a predetermined path from operative position relative to the magnetic structure to a position external to the magnetic structure; said magnetic structure comprising first inner and outer magnetic pole pieces disposed on a first side of said passage, said pole pieces being spaced to define an arcuate air gap extending around said axis for reception of a first one of the coil sides, second inner and outer magnetic pole pieces disposed on a second side of said passage, said second pole pieces being spaced to define an arcuate air gap extending around said axis for reception of a second one of the coil sides, said inner magnetic pole pieces being positioned between the air gaps, magnetic means extending around a first end of the passage for uniting in a first pair the first inner and the second outer magnetic pole pieces, magnetic means extending around a second end of the passage for uniting in a second pair the second inner and the first outer magnetic pole pieces, and a separate magnetic member magnetically shunting each of the air gaps; and a source of magnetomotive force having a separate pole magnetically connected to each of said pairs for directing magnetic flux through said air gaps, said magnetic members being proportioned to saturate in response to the normal working magnetomotive force developed across the associated air gaps.

12. In a moving-coil instrument; a unitary magnetic structure; a moving-coil unit having two spaced coil sides; means mounting the moving-coil unit for rotation relative to the magnetic structure about an axis intermediate the coil sides, said magnetic structure having a passage permitting removal of the coil unit through a predetermined path from operative position relative to the magnetic structure to a position external to the magnetic structure; said magnetic structure comprising first inner and outer magnetic pole pieces disposed on a first side of said passage, said pole pieces being spaced to define an arcuate air gap extending around said axis for reception of a first one of the coil sides, second inner and outer magnetic pole pieces disposed on a second side of said passage, said second pole pieces being spaced to define an arcuate air gap extending around said axis for reception of a second one of the coil sides, said inner magnetic pole pieces being positioned between the air gaps, magnetic means extending around a first end of the passage for uniting in a first pair of the first inner and the second outer magnetic pole pieces, magnetic means extending around a second end of the passage for uniting in a second pair the second inner and the first outer magnetic pole pieces, and a separate magnetic member magnetically shunting each of the air gaps; and a source of magnetomotive force having a separate pole magnetically connected to each of said pairs for directing magnetic flux through said air gaps, said magnetic members being proportioned to saturate in response to the magnetomotive force developed across the associated air gaps, a magnetic element shunting one of the magnetic members, and means mounting the magnetic element for movement relative to the magnetic structure to vary the resultant reluctance of the parallel magnetic paths established by the magnetic element and the associated magnetic member.

13. In a moving-coil device, a coil, a magnet having a recess between its pole faces, and a unitary magnetic structure comprising a pair of magnetic pole pieces spaced to define an air gap within which a side of the coil is disposed, one of said pole pieces extending through the coil, each of said magnetic pole pieces being associated with a separate pole face of the magnet for directing magnetic flux from the magnet through the air gap, and a magnetic bridge bridging the air gap for spacing the pole pieces from each other, said bridge being designed to saturate in advance of said pole pieces and being disposed substantially in said recess, and mechanism mounting the coil for movement relative to the magnetic structure.

14. A magnetic structure for a moving-coil instrument comprising a magnetic core, a pair of magnetic pole pieces spaced from said magnetic core for defining a separate arcuate air gap between the magnetic core and each of the magnetic pole pieces, and an adjustable magnetic shunt for establishing an adjustable shunt path for magnetic flux from one of the magnetic pole pieces to the magnetic core.

15. A magnetic structure as claimed in claim 14, wherein said one of the magnetic pole pieces and said magnetic core have magnetic portions which in operation have different magnetic potentials and which are spaced and shaped to define a substantially cylindrical opening therebetween, and a substantially cylindrical magnetic member disposed in the opening for movement axially of said opening to shunt an adjustable amount of magnetic flux away from the associated air gap during operation of the instrument.

16. A magnetic structure for a moving-coil instrument comprising a magnetic member provided with an arcuate air gap and provided with a substantially cylindrical opening communicating with the air gaps, said air gaps and said opening constituting a passage substantially dividing the magnetic member into two magnetic portions operable at different magnetic potentials to establish a magnetic field in the air gap, and a substantially cylindrical magnetic shunt disposed in said cylindrical opening for movement relative to the magnetic member to adjust the strength of said magnetic field during operation of the magnetic structure.

17. In a moving-coil instrument, a magnetic structure provided with an air gap which is substantially cylindrical about an axis, said magnetic structure having a substantially cylindrical opening communicating with one end of the air gap, said opening and the air gap constituting a passage which substantially divides the magnetic structure into an inner magnetic pole piece intermediate the passage and the axis and an outer magnetic pole piece capable of operating at different magnetic potentials for establishing a magnetic field in the air gap, a magnet for supplying magnetic flux to the pole pieces to establish a magnetic field in the air gap, a substantially cylindrical magnetic shunt disposed in the opening for axial movement relative to the magnetic structure, whereby said magnetic shunt may be moved to adjust the strength of the magnetic field in the air gap, a coil having a side disposed in said air gap, and means mounting said coil for rotation about said axis.

18. In a moving-coil device, a coil, a first magnetic pole piece extending through the coil, a second magnetic pole piece spaced from the first magnetic pole piece to define an air gap for a side of the coil, a bridge bridging the air gap and permanently uniting the first magnetic pole piece and the second magnetic pole piece in a permanent structure, said structure having a passage communicating with the air gap through which the coil may be inserted in operative position relative to the structure and through which the coil may be removed from the structure without disturbing the structure, and a magnet comprising a magnetic body having a first pole face magnetically connected to the first magnetic pole piece and having a second pole face magnetically connected to the second magnetic pole piece for establishing a magnetic field in the air gap, said bridge being designed to carry magnetic-flux having a value substantially smaller than that of the air gap under normal operating conditions for the device.

19. In a moving coil device, a coil unit having first and second coil sides positioned on opposite sides of an axis, a magnetic structure, means mounting the coil unit for rotation about said axis relative to the magnetic structure, the magnetic structure comprising a first magnetic pole piece extending through the coil unit, a second magnetic pole piece spaced from the first magnetic pole piece to define therewith an air gap for the first coil side, a bridge bridging the air gap and permanently uniting the first and second pole pieces in a permanent assembly, a third magnetic pole piece extending through the coil unit, a fourth magnetic pole piece spaced from the third magnetic pole piece to define therewith a second air gap for the second coil side, and a bridge bridging the second air gap and permanently uniting the third and fourth pole pieces in a permanent assembly, said pole pieces extending through the coil unit being spaced to define a passage communicating with the air gaps through which the coil unit may be inserted in operative position relative to the magnetic structure and removed from the magnetic structure without disturbing the magnetic structure, and a magnet unit having pole faces engaging the magnetic structure for establishing magneto-motive forces across the air gaps, said bridges being designed to limit magnetic flux therethrough to a value substantially less than that in the associated air gaps under normal operating conditions for the device.

20. A device as claimed in claim 19 in combination with a support for the coil unit detachably secured to the magnetic structure, said mounting means mounting the coil unit on the support for rotation relative to the support, the passage being proportioned to permit insertion therethrough of the support and the coil unit mounted thereon as a single assembly into operative position relative to the magnetic structure and to permit removal of the single assembly from the magnetic structure without disturbing the magnetic structure.

DOUGLASS A. YOUNG.

REFERENCES CITED

The following references are of record in the file of this patent:

UNITED STATES PATENTS

| Number | Name | Date |
|---|---|---|
| 1,740,548 | MacGahan | Dec. 24, 1929 |

FOREIGN PATENTS

| Number | Country | Date |
|---|---|---|
| 13,707 | Great Britain | June 8, 1911 |